(12) United States Patent
Noorzad et al.

(10) Patent No.: US 10,826,581 B1
(45) Date of Patent: Nov. 3, 2020

(54) MACHINE-LEARNING BASED METHOD FOR MIMO DETECTION COMPLEXITY REDUCTION

(71) Applicant: QUALCOMM Incorporated, San Diego, CA (US)

(72) Inventors: Parham Noorzad, San Diego, CA (US); Siddhartha Mallik, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/517,217

(22) Filed: Jul. 19, 2019

(51) Int. Cl.
*H04B 7/04* (2017.01)
*H04B 7/0456* (2017.01)

(52) U.S. Cl.
CPC ......... *H04B 7/0473* (2013.01); *H04B 7/0482* (2013.01)

(58) Field of Classification Search
CPC ........................... H04B 7/0473; H04B 7/0482
See application file for complete search history.

(56) References Cited

U.S. PATENT DOCUMENTS

| | | | |
|---|---|---|---|
| 2009/0220034 A1* | 9/2009 | Ramprashad | H04L 1/0048 375/341 |
| 2015/0288437 A1* | 10/2015 | Raju | H04B 7/0486 375/219 |
| 2018/0309601 A1* | 10/2018 | Kim | H04L 25/03006 |
| 2019/0149362 A1* | 5/2019 | Jalloul | H04L 25/0256 375/341 |

* cited by examiner

*Primary Examiner* — Dac V Ha
(74) *Attorney, Agent, or Firm* — Arent Fox, LLP

(57) ABSTRACT

A machine-learning based multiple-input, multiple-output (MIMO) demapper for a wireless device may include a classifier that selects which MIMO demapper to use for a sample for a particular tone. For example, a wireless device may receive via a plurality of antennas a plurality of signals including a plurality of tones. The wireless device may determine selection features for each tone of the plurality of tones. The wireless device may select, for each tone, by the classifier based on the selection features, a selected demapper from at least a first MIMO demapper and a second MIMO demapper. The second MIMO demapper may have a different performance characteristic than the first MIMO demapper. The wireless device may detect, for each tone, one or more streams using the selected demapper for the tone. A stream may refer to a sequence of bits.

30 Claims, 9 Drawing Sheets

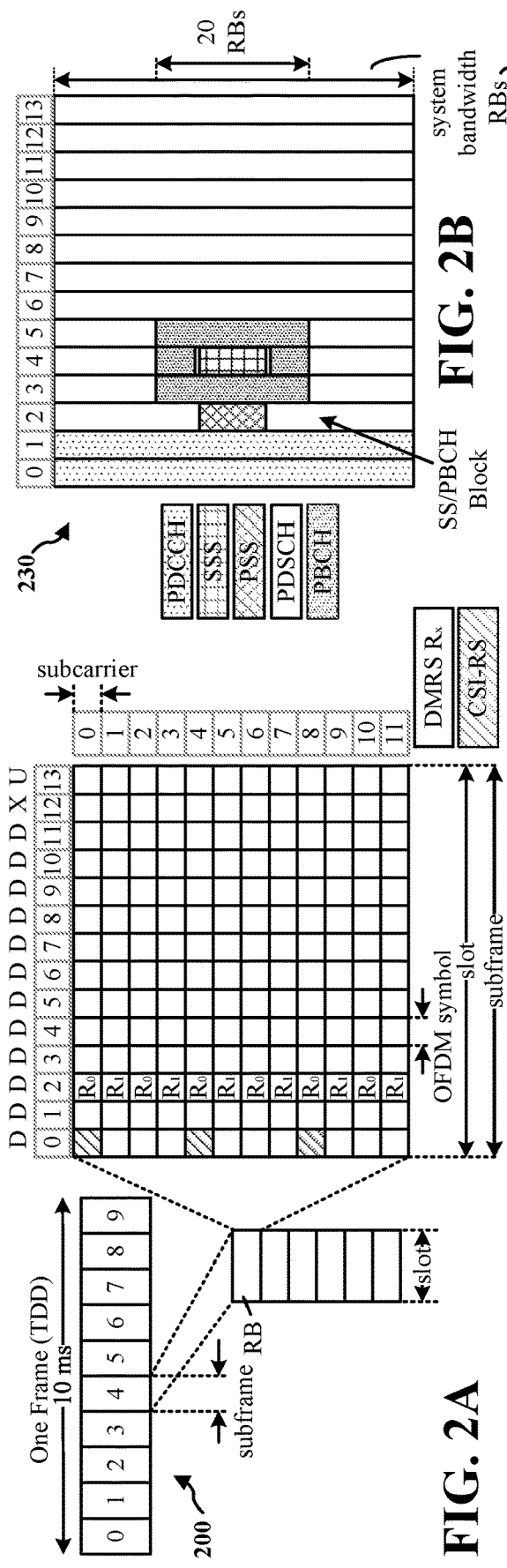
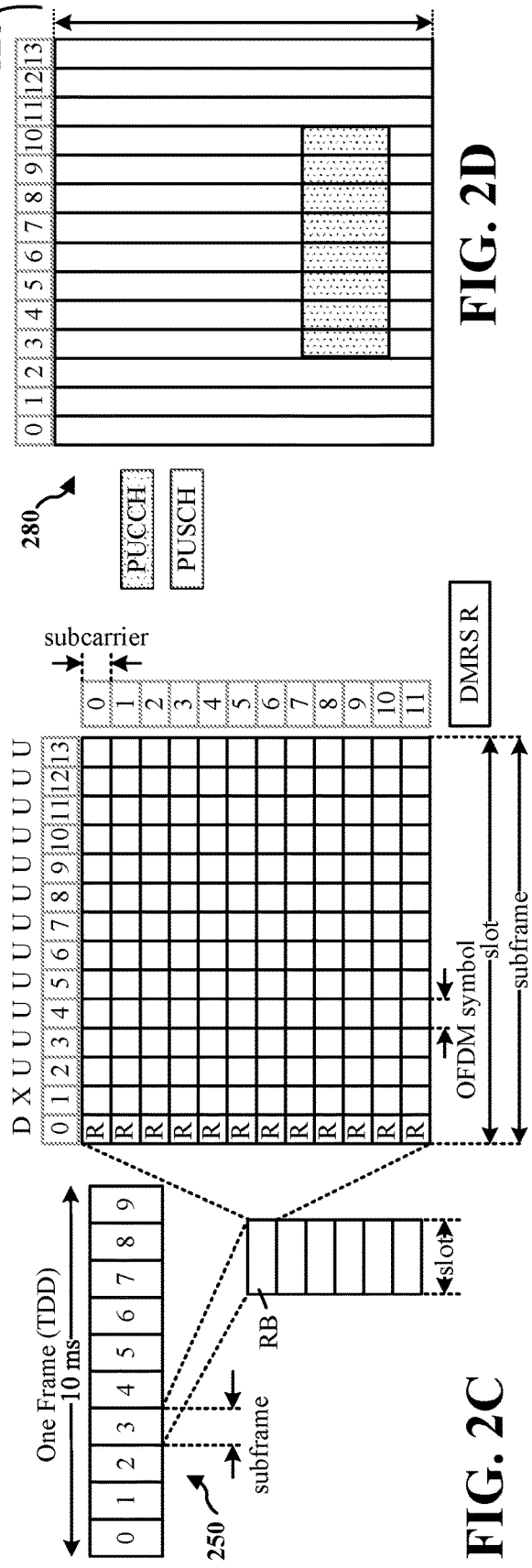

MACHINE-LEARNING BASED METHOD FOR MIMO DETECTION COMPLEXITY REDUCTION

BACKGROUND

Technical Field

The present disclosure relates generally to communication systems, and more particularly, to multiple-input, multiple-output (MIMO) detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and apparatuses are provided. For example, a method of wireless communication may include receiving, via a plurality of antennas, a plurality of signals including a plurality of tones. The method may include determining selection features for each tone of the plurality of tones. The method may include selecting, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper. The method may include determining, for each tone, one or more streams based on an output of the selected demapper for the tone.

In an aspect, an apparatus for wireless communication may include a memory and at least one processor coupled to the memory. The processor may be configured to receive via a plurality of antennas a plurality of signals including a plurality of tones. The processor may be configured to determine selection features for each tone of the plurality of tones. The processor may be configured to select, for each tone, by a classifier based on the selection features, a selected demapper from at least a first MIMO demapper and a second MIMO demapper, wherein the second MIMO demapper has a different performance characteristic than the first MIMO demapper. The processor may be configured to determine, for each tone, one or more streams based on an output of the selected demapper for the tone.

In an aspect, another apparatus for wireless communication may include means for receiving via a plurality of antennas a plurality of signals including a plurality of tones. The apparatus may include means for determining selection features for each tone of the plurality of tones. The apparatus may include means for selecting, for each tone, by a classifier based on the selection features, a selected demapper from at least a first MIMO demapper and a second MIMO demapper, wherein the second MIMO demapper has a different performance characteristic than the first MIMO demapper. The apparatus may include means for determining, for each tone, one or more streams based on an output of the selected demapper for the tone.

In another aspect, the disclosure provides a non-transitory computer-readable medium storing computer executable code, the code when executed by a processor causes the processor to determine one or more streams of received signals. The non-transitory computer-readable medium may include code to receive via a plurality of antennas a plurality of signals including a plurality of tones. The non-transitory computer-readable medium may include code to determine selection features for each tone of the plurality of tones. The non-transitory computer-readable medium may include code to select, for each tone, by a classifier based on the selection features, a selected demapper from at least a first MIMO demapper and a second MIMO demapper, wherein the second MIMO demapper has a different performance characteristic than the first MIMO demapper. The non-transitory computer-readable medium may include code to determine, for each tone, one or more streams based on an output of the selected demapper for the tone.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a UL channels within a 5G/NR subframe.

DETAILED DESCRIPTION

Figure 1:
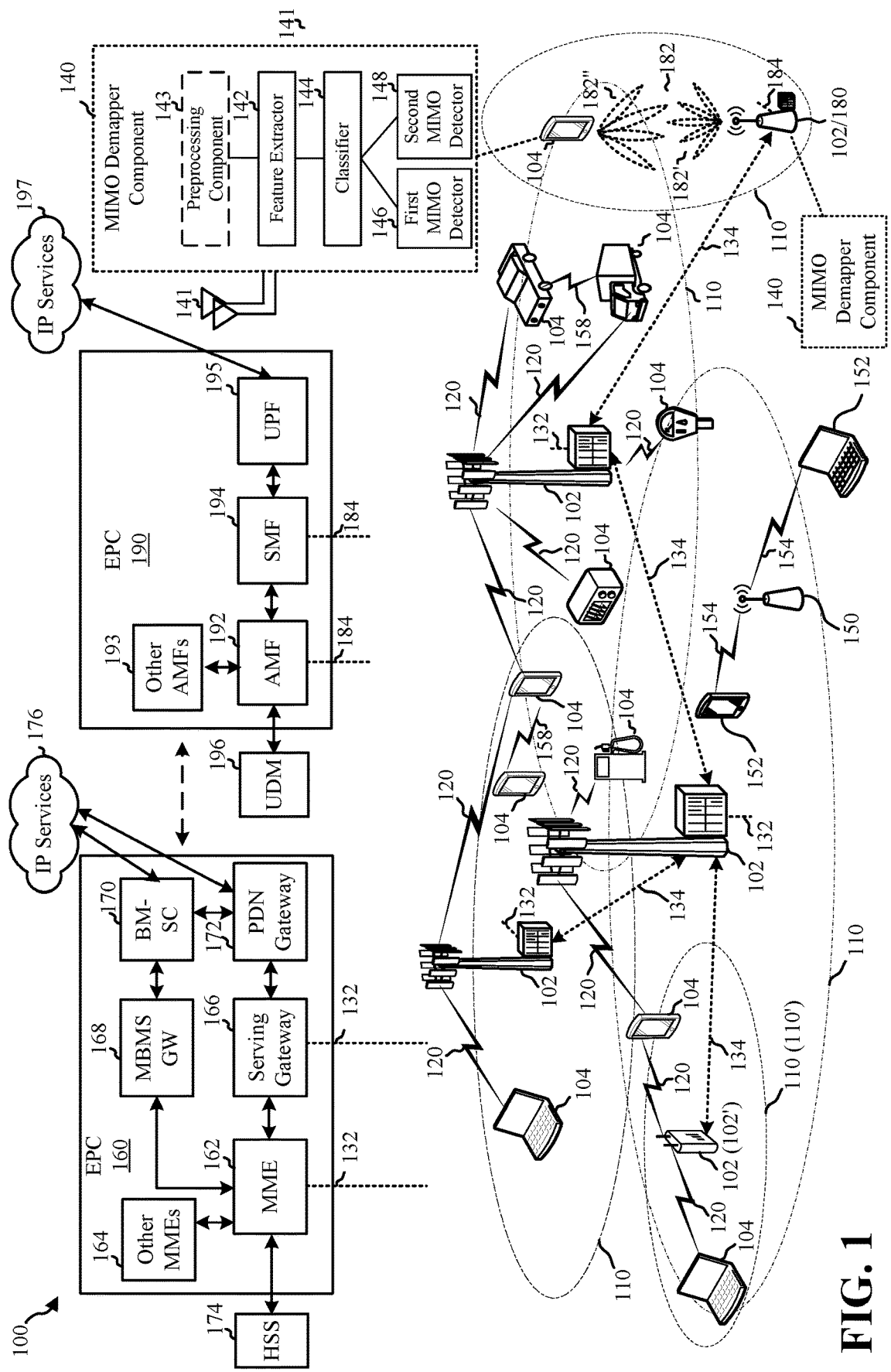
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In MIMO systems, multiple input antennas receive signals transmitted by multiple output antennas. A MIMO demapper (which may alternatively be referred to as a MIMO detector) at the receiving device may receive the signal from the multiple input antennas and determine one or more streams transmitted by the multiple output antennas. Various MIMO demappers are known in the art and vary in terms of complexity and performance. For example, a sphere decoder uses adaptive complexity to provide high detection performance, especially at high SNR. Due to the adaptive complexity, however, in some cases, the sphere decoder may spend a lot of time processing a very small fraction of samples. That is, the processing time of the sphere decoder may have a long tail of poor processing times and high complexity for a small number of samples in the worst case. The poor, worst case processing times may make the sphere decoder impractical for real-world use. One approach to achieve good performance is a fixed complexity approximate maximum likelihood (FC-AML) decoder. The fixed complexity, however, may be less efficient than the sphere decoder for a large portion of the samples. A third class of MIMO demappers, successive interference cancellation (SIC), may have minimal complexity and high efficiency, but poor average performance due to poor performance on certain samples.

In an aspect, the present disclosure provides for a machine-learning based MIMO demapper in which a classifier selects which MIMO demapper to use for a sample for a particular tone. For example, a UE may receive, via a plurality of antennas, a plurality of signals including a plurality of tones. The UE may determine selection features for each tone of the plurality of tones. The UE may select, for each tone, by the classifier based on the selection features, a selected demapper from at least a first MIMO demapper and a second MIMO demapper. The second MIMO demapper may have a different performance characteristic than the first MIMO demapper. Moreover, the present disclosure is not limited to two MIMO demappers and may include three or more MIMO demappers. The different performance characteristics of the MIMO demappers may result in tradeoffs or relative advantages in at least some cases. Accordingly, by selecting a MIMO demapper for a specific case (e.g., an input tone), the UE may reduce costs (e.g., power consumption) or improve performance. The UE may detect, for each tone, one or more streams using the selected demapper for the tone. A stream may refer to a sequence of bits. In an aspect, for example, a MIMO demapper may operate at the symbol level and detect a stream for each transmit antenna. Accordingly, the stream may correspond to a number of bits mapped to the symbol depending on a modulation scheme. Log likelihood ratios (LLRs) may be used to represent a confidence in the detected symbol, so a stream may correspond to a sequence of LLRs. A MIMO demapper may operate on multiple symbols, and a stream may include bits or LLRs for the multiple symbols.

In an aspect, the MIMO demapper may be implemented as an integrated circuit. In an aspect, the MIMO demapper may reduce power consumption by assigning only a portion of tones to a relatively high complexity MIMO demapper and the rest of the tones to a relatively low complexity MIMO demapper. The assigning may be based on a confidence value for the relatively low complexity MIMO demapper. In another aspect, the MIMO demapper may reduce chip hardware area of the MIMO demapper by limiting a number of the relatively high complexity MIMO demappers operating in parallel and selecting the portion of the tones to be processed by the limited number of relatively high complexity MIMO demappers.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC)) 190). The base stations 102 may include macrocells (high power cellular base station) and/or small cells (low power cellular base station). The macrocells include base stations. The small cells include femtocells, picocells, and microcells.

In an aspect, a UE 104 may include a MIMO demapper component 140 that receives a signal including a plurality of tones and selects a MIMO demapper for each tone to determine one or more streams. The MIMO demapper component 140 may include a plurality of antennas 141 to receive the signal including the plurality of tones, a feature extractor 142 to extract one or more features of each tone to be used for classification, and a classifier 144 to select a MIMO demapper from at least a first MIMO demapper 146 and a second MIMO demapper 148. In an aspect, the MIMO demapper component 140 may include a pre-processing component 143 that performs preprocessing (e.g., normalization or whitening) on the signals received via the plurality of antennas 141. The first MIMO demapper 146 may have different performance characteristics than the second MIMO demapper 148. For example, the first MIMO demapper 146 may be less complex than the second MIMO demapper 148, but the second MIMO demapper 148 may perform better (e.g., more accurately) for at least some samples. The MIMO demapper component 140 may include additional MIMO demappers (not shown) that may have different performance characteristics, at least for some samples. The classifier 144 may determine, based on the extracted features for a tone, which MIMO demapper is most likely to produce a desired performance characteristic. For example, in order to save power without sacrificing accuracy, the classifier 144 may select the least complex classifier that is estimated to provide an accuracy for a tone that satisfies a threshold. As another example, if the first MIMO demapper performs better at a high SNR while the second MIMO demapper performs better at a lower SNR, the classifier 144 may select the predicted better performing MIMO demapper based on an average SNR for each tone.

In another aspect, a base station 102 may include a MIMO demapper component 140 that includes similar components to the MIMO demapper component 140 at the UE 104. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D are resource diagrams of example frame structures and channels that may be used for 5G NR communications by a UE 104 and base station 102 including a MIMO demapper component 140. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
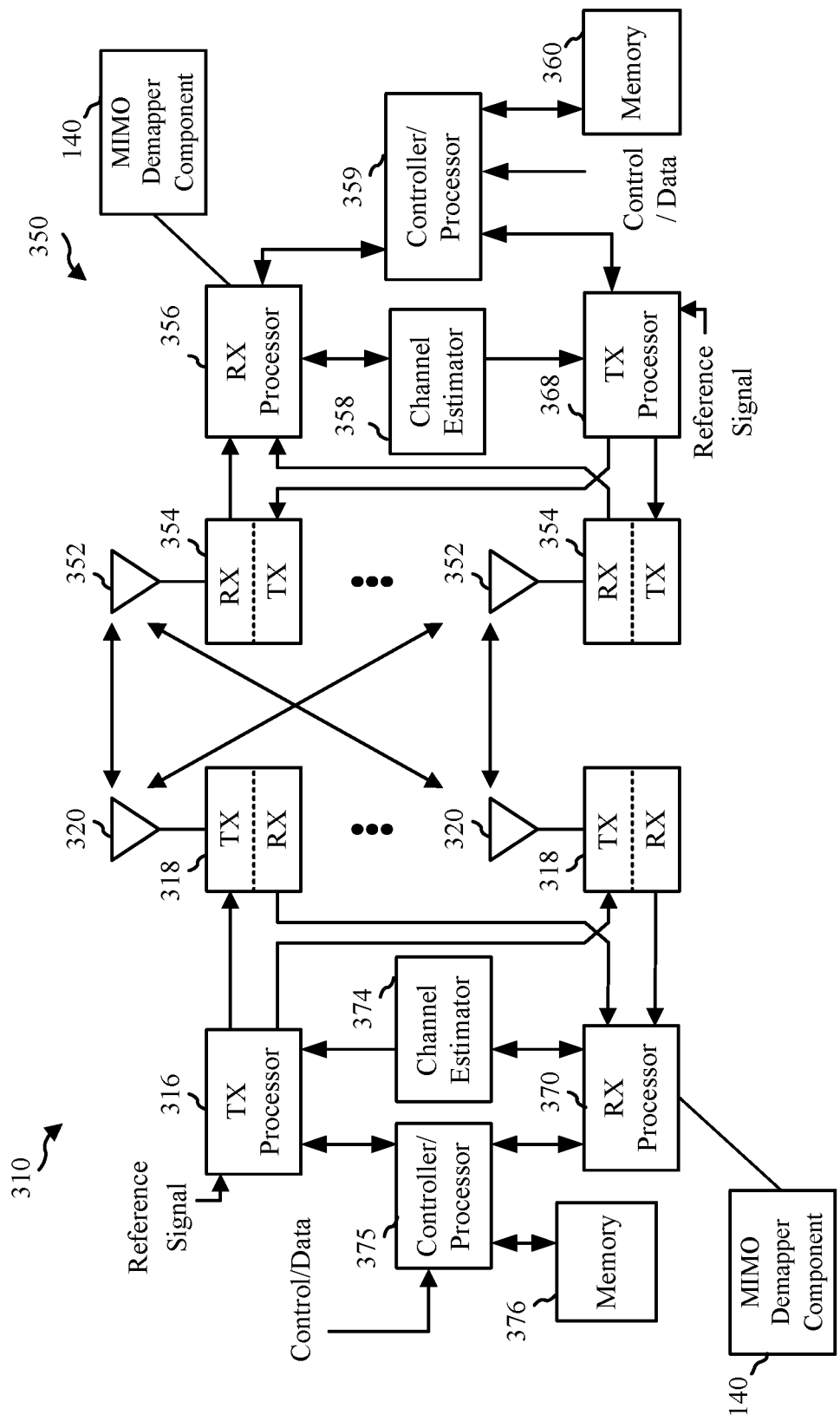
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. In an aspect, the RX processor 356 may include the MIMO demapper component 140 to determine one or more streams. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. In an aspect, the RX processor 370 may include the MIMO demapper component 140 to determine one or more streams.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the MIMO demapper component 140 of FIG. 1 at the UE 104. At least one of the TX processor 316, the RX processor 370, and the controller/processor 375 may be configured to perform aspects in connection with the MIMO demapper component 140 of FIG. 1 at the base station 102.

Figure 4:
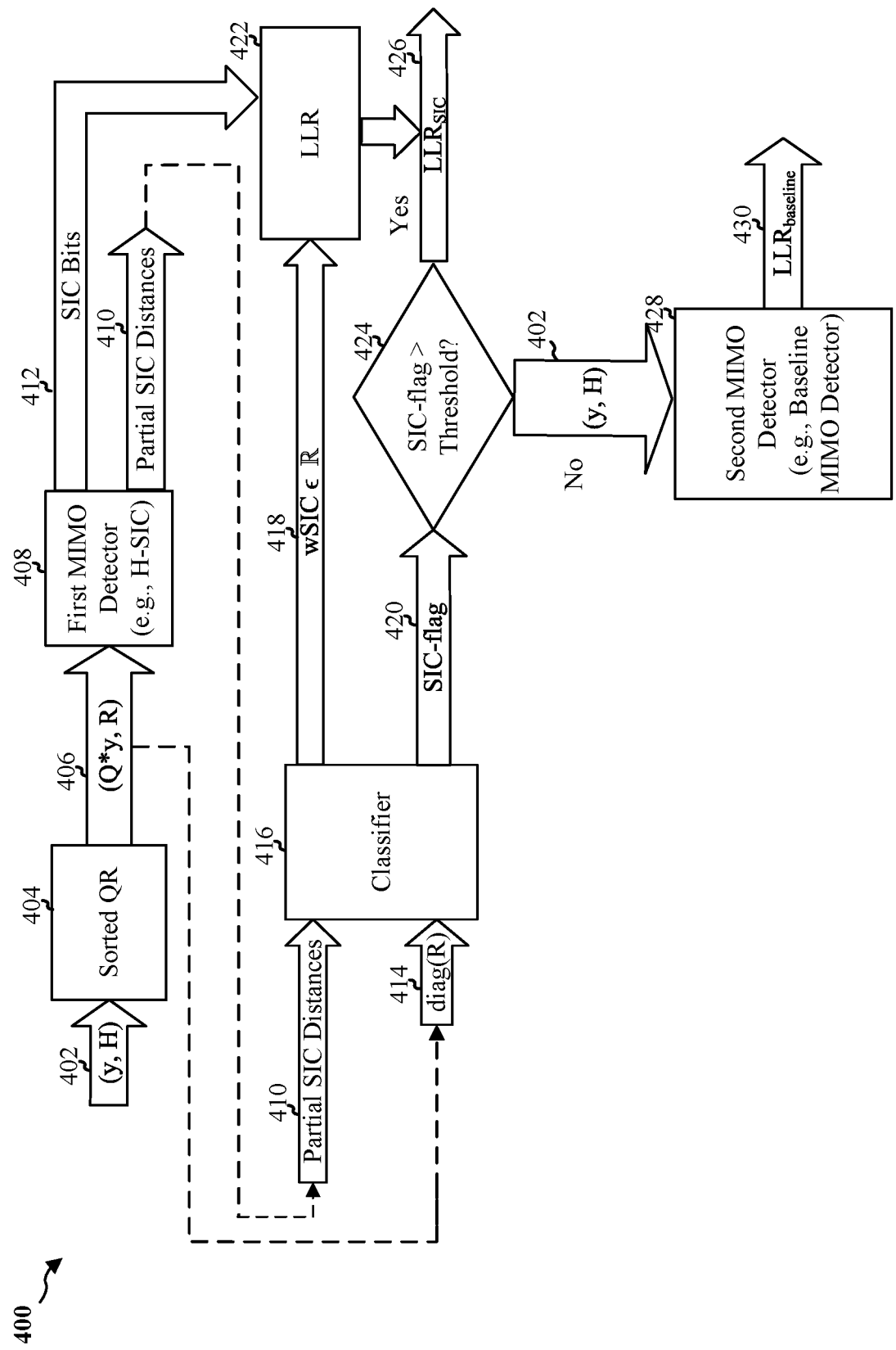
FIG. 4 is a block diagram of an example MIMO demapper component including a classifier that selects between multiple MIMO demappers.

FIG. 4 is a block diagram of an example MIMO demapper 400 that may correspond to the MIMO demapper component 140. The MIMO demapper 400 may receive an input tone 402 from antennas 141 (FIG. 1). The input tone 402 may be a whitened received signal. Whitening may normalize the received data and estimated channel by an average SNR. The input tone 402 may be represented by (y,H), where y is a vector of samples for the whitened received tone of size n and H is a n×m matrix representing the whitened estimated channel where n is the number of receive antennas and m is the number of streams. The input tone 402 may undergo preprocessing 404, which may be, for example, a sorted QR operation, that outputs processed results 406, which may be represented by (Q*y, R), where Q is the transpose of a matrix determined by the preprocessing 404 and R is a matrix representing post-processed channel H. The processed results 406 may also be referred to as $\tilde{y}$.

A first MIMO demapper 408 may be, for example, a hard sequential interference cancellation (H-SIC) block. A "hard" MIMO demapper may output estimated bits, whereas a "soft" MIMO demapper may output log likelihood ratios (LLRs), which may also be referred to as soft bits. In the illustrated example, the first MIMO demapper 408 may be used as the feature extractor 142. The first MIMO demapper 408 may generate SIC bits 412 and partial SIC distances 410. The SIC bits 412 may be the transmitted bits determined by the first MIMO demapper 408 for each tone.

The partial SIC distances 410 may be features of the input tone 402 that predict a confidence value for the first MIMO demapper 408. The partial SIC distances 410 may be calculated based on the SIC bits 412. In an aspect, for example, the SIC bits 412 may be represented as $(\hat{x}_0, \hat{x}_1, \hat{x}_2, \hat{x}_3)$. Other features may be based on the processed channel R, or the diagonal 414 of the processed channel R. The partial SIC distances 410 and the diagonal 414 of the processed channel R may be provided to a classifier 416. For example, features for rank 4 MIMO may include the diagonal values of R: $r_{00}$, $r_{11}$, $r_{22}$, $r_{33}$ Other features for rank 4 MIMO based on the partial SIC distances may include:

$$\|\tilde{y}_3 - r_{33}\hat{x}_3\|^2$$

$$\|\tilde{y}_2 - r_{22}\hat{x}_2 - r_{23}\hat{x}_3\|^2$$

$$\|\tilde{y}_1 - r_{11}\hat{x}_1 - r_{12}\hat{x}_2 - r_{13}\hat{x}_3\|^2$$

$$\|\tilde{y}_0 - r_{00}\hat{x}_0 - r_{01}\hat{x}_1 - r_{02}\hat{x}_2 - r_{03}\hat{x}_3\|^2$$

In an aspect, performing feature extraction based on H-SIC may include forty (40) real multiplications and eight (8) real rounding operations. This complexity may be less than performing MIMO detection using a fixed complexity MIMO demapper. Accordingly, the reduced complexity may provide power and/or hardware area savings based on implementation.

The classifier 416 may be, for example, a neural network classifier trained to generate a weight 418 for the first MIMO demapper 408. The weight 418 (e.g., $w_{SIC}$) may be a real number indicating a measure of a confidence in the SIC bits 412 being correct. The classifier 416 may also generate a confidence value 420 (e.g., SIC-flag). The confidence value 420 may indicate a probability that the second MIMO demapper 428 will not generate a better estimate of the transmitted bits. Accordingly, the confidence value 420 may be related to the weight 418, but may also account for the second MIMO demapper 428. The weight 418 may be provided to a log likelihood ratio (LLR) component 422 that may generate an $LLR_{SIC}$ 426 for the first MIMO demapper 408 based on the SIC bits 412 and the weight 418. For example, LLR component 422 may determine the $LLR_{SIC}$ 426 according to the following formula:

$$LLR_{SIC} = w_{SIC} \times (2 \times SIC\ Bits - 1).$$

At decision block 424, if the confidence value 420 (e.g., SIC-flag) is greater than a threshold (e.g., 0.5), the first MIMO demapper 408 may be selected. Accordingly, the $LLR_{SIC}$ 426 output by the LLR component 422 may be selected when the confidence value 420 is greater than the threshold. That is, if the confidence value 420 indicates that the second MIMO demapper 428 is unlikely to improve on the performance of the first MIMO demapper 408, the decision block 424 may select the output of the first MIMO demapper 408. If the confidence value 420 is less than or equal to the threshold for a tone, the second MIMO demapper 428 may be selected for the tone.

The second MIMO demapper 428 may be, for example, a FC-AML demapper, which may be referred to as a baseline MIMO demapper because existing receivers may use similar demappers to achieve performance goals. The input tone 402 may be provided to the second MIMO demapper 428 for each tone where the second MIMO demapper 428 is the selected demapper. The second MIMO demapper 428 may generate an $LLR_{baseline}$ 430 that represents the transmitted bits estimated by the second MIMO demapper 428. Since only a portion of the tones are processed by the second MIMO demapper 428, the demapper 400 may have reduced average complexity per resource element compared to a baseline demapper that processes every tone with the baseline MIMO demapper. For example, in simulations of a 256-QAM, rank 4, scenario with a ten percent (10%) block error rate target, the percentage of tones that may be processed by the first MIMO demapper 408 instead of the second MIMO demapper 428 was between forty percent (40%) and seventy percent (70%).

Figure 5:
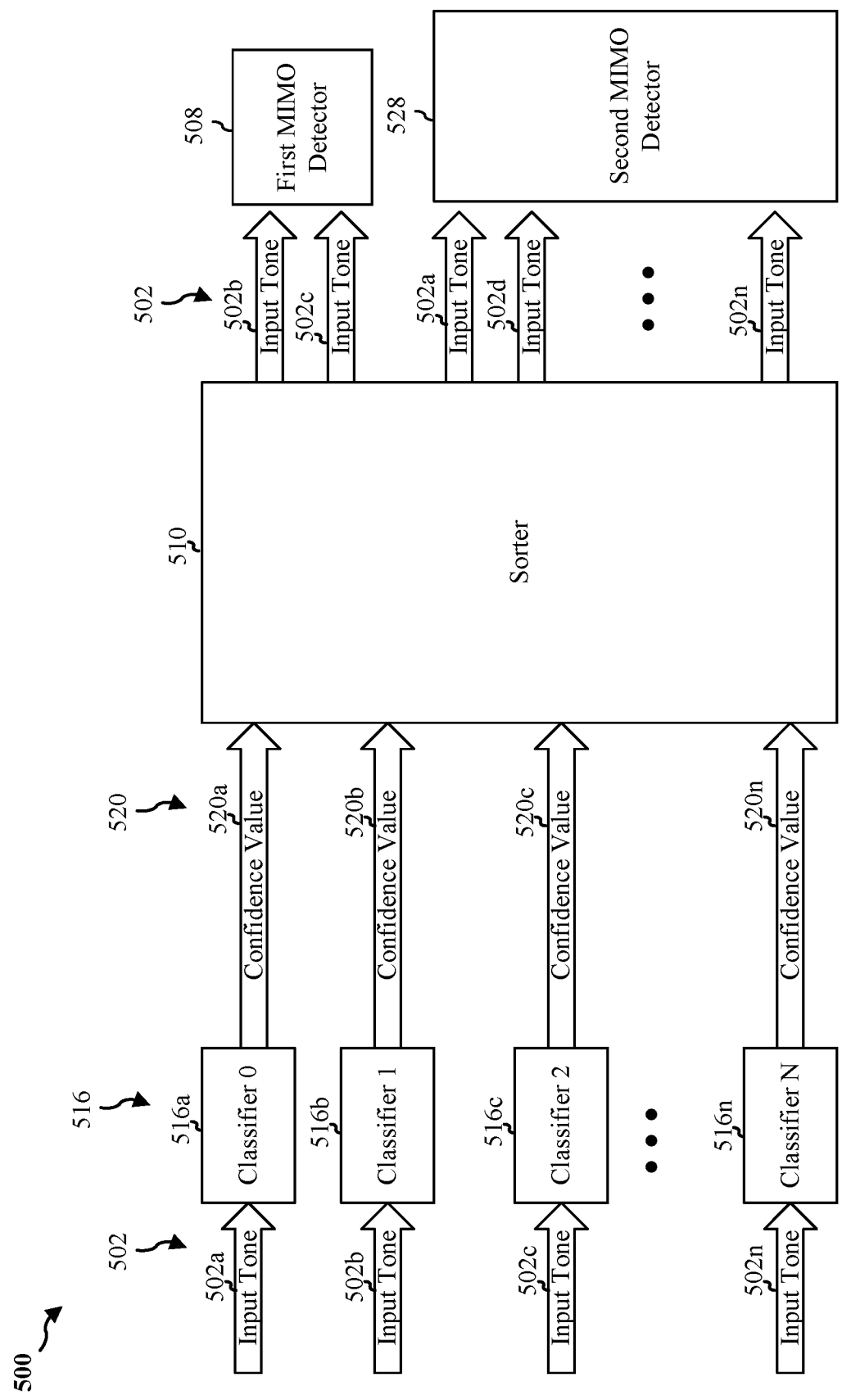
FIG. 5 is a block diagram of an example MIMO demapper component including a classifier that assigns a limited number of tones to a relatively high complexity MIMO demapper based on a ranking for a relatively low complexity MIMO demapper.

FIG. 5 is a block diagram of an example MIMO demapper 500 that may correspond to the MIMO demapper component 140. The example MIMO demapper 500 may be implemented in hardware using parallel components while saving hardware area by limiting a maximum number of tones for a second MIMO demapper 528 having greater complexity than a first MIMO demapper 508. That is the size of the second MIMO demapper 528 may be fixed to a size less than a total number of tones in a peak throughout scenario (e.g., full resource block allocation and maximum rank). Accordingly, the second MIMO demapper 528 may be limited to a fraction of the total number of input tones.

Each input tone 502 (e.g., 502a, 502b, 502c, . . . 502n) may be processed by a respective classifier 516 (e.g., classifiers 516a, 516b, 516c, . . . 516n) to determine a confidence value 520 (e.g., confidence values 520a, 520b, 520c, . . . 520n) for the first MIMO demapper 508. In an aspect, each classifier 516 may be implemented as described above with respect to FIG. 4 using features extracted during pre-processing and/or by the first MIMO demapper 508. In an aspect, other input features to the classifiers 516 may be based on retransmissions and stored LLRs, or feedback from the decoder. For example, tones corresponding to a retransmission may be assigned a lower confidence value due to a previous failure associated with the transmission in order to ensure processing by the second MIMO demapper 528.

A sorter 510 may rank the input tones 502 in order of the confidence value 420. The sorter 510 may provide a first number of the lowest ranked input tones 502 (e.g., input tones 502a, 502d, . . . 502n) up to the maximum number of tones for the second MIMO demapper 528 to the second MIMO demapper 528. The sorter 510 may provide a second number (e.g., a number of remaining tones equal to the total number of tones minus the first number of tones) of the highest ranked input tones 502 (e.g., input tones 502b, 502c) to the first MIMO demapper 508. Accordingly, even in the peak throughput scenario, the maximum complexity may be fixed by the size of the second MIMO demapper 528. In scenarios with less than the maximum throughput, the sorter 510 may assign a higher proportion of tones to the second MIMO demapper 528 for maximum performance. Alternatively, the sorter 510 may assign tones to the first MIMO demapper 508 and the second MIMO demapper 528 in the same proportion as in the maximum throughput scenario, or may utilize a threshold in the same manner as the decision block 424 described above with respect to FIG. 4 for power savings.

Figure 6:
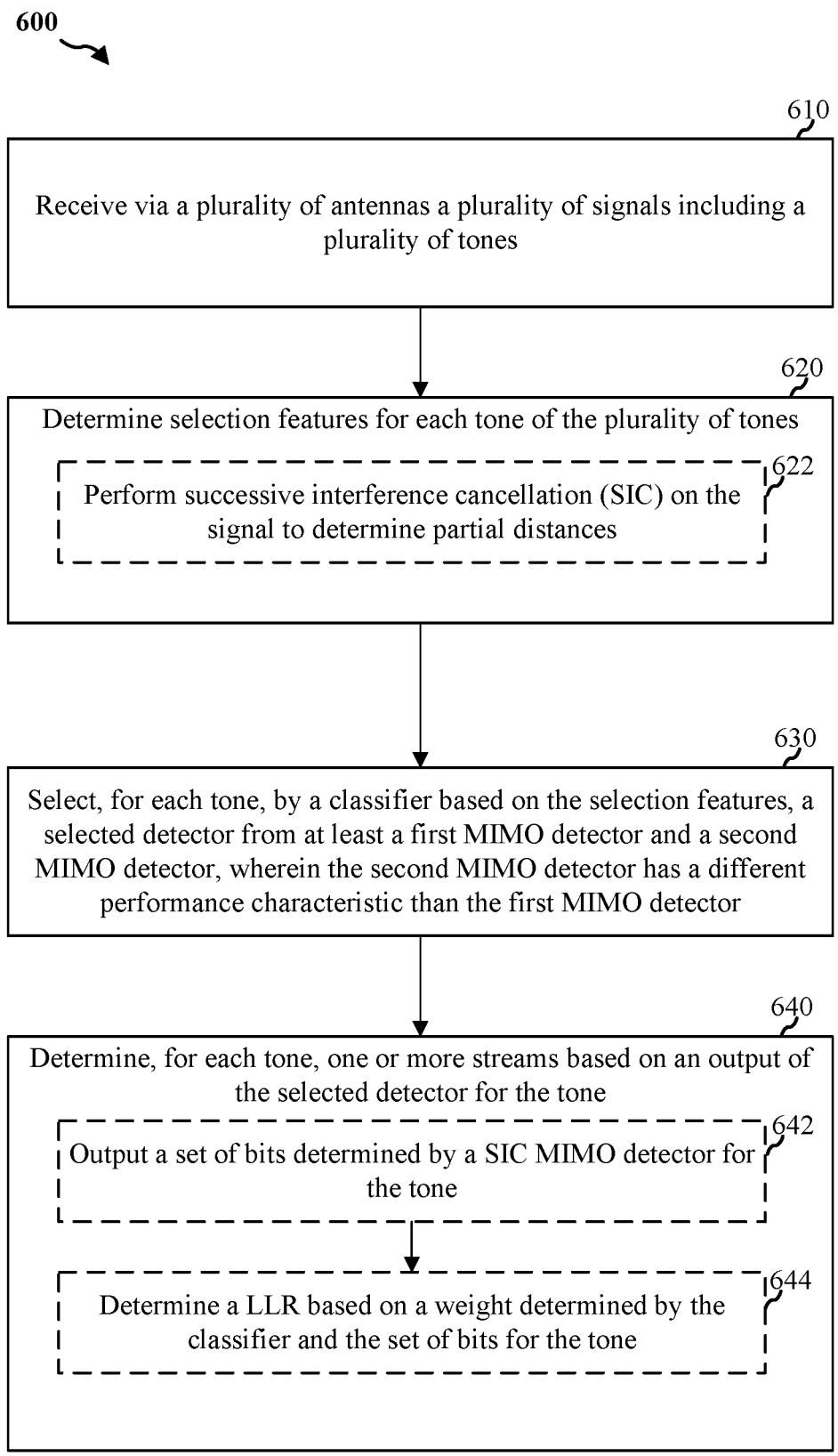
FIG. 6 is a flowchart of an example method of wireless communication.

FIG. 6 is a flowchart of a method 600 of wireless communication. The method 600 may be performed by a UE (e.g., the UE 104, which may include the memory 360 and which may be the entire UE 104 or a component of the UE 104 such as the MIMO demapper component 140, TX processor 368, the RX processor 356, and/or the controller/processor 359). In an aspect, the method 600 may be performed by a base station (e.g., the base station 102, which may include the memory 376 and which may be the entire base station 102 or a component of the base station 102, such as the MIMO demapper component 140, TX processor 316, the RX processor 370, and/or the controller/processor 375).

At block 610, the method 600 may include receiving, via a plurality of antennas, a plurality of signals including a plurality of tones. In an aspect, for example, the UE 104, the RX processor 356, and/or the controller/processor 359 may execute the MIMO demapper component 140 to receive via a plurality of antennas 141 a plurality of signals including a plurality of tones. The signals may be transmitted by a plurality of antennas at a transmitting device (e.g., base station 102 if the method 600 is performed by the UE 104). Accordingly, the signals may be a MIMO transmission. The plurality of tones may correspond to allocated frequency domain resources for the transmission. Accordingly, the UE 104, the RX processor 356, the controller/processor 359, and/or the antennas 141 may provide means for receiving via a plurality of antennas a plurality of signals including a plurality of tones.

At block 620, the method 600 may include determining selection features for each tone of the plurality of tones. In an aspect, for example, the UE 104, the RX processor 356, and/or the controller/processor 359 may execute the MIMO demapper component 140 and/or the feature extractor 142 to determine selection features for each tone of the plurality of tones. As discussed above with respect to FIG. 4, in an aspect, the selection features may be based on an estimated channel (H), a preprocessed estimated channel (R), diagonals 414 of the estimated channel or the preprocessed estimated channel, and/or partial SIC distances 410. Accordingly, the UE 104, the RX processor 356, and/or the controller/processor 359 executing the MIMO demapper component 140 and/or the feature extractor 142 may provide means for determining selection features for each tone of the plurality of tones.

In an aspect, at sub-block 622, the block 620 may optionally include performing SIC on the respective tone to determine partial distances. For example, as discussed above, a H-SIC block, which may be part of a first MIMO demapper 146 may perform SIC on the respective tone to determine partial SIC distances 410. In an aspect where the first MIMO demapper 146 does not perform SIC, the feature extractor 142 may include the H-SIC block and perform SIC on the respective tone to determine partial distances. The partial distances may be selected based on predictive ability of a confidence level for the first MIMO demapper 146. For example, the partial distances may include a set of partial distances used to train the classifier 144.

At block 630, the method 600 may include selecting, for each tone, by a classifier based on the selection features, a selected demapper from at least a first MIMO demapper and a second MIMO demapper. In an aspect, for example, the UE 104, the RX processor 356, and/or the controller/processor 359 may execute the MIMO demapper component 140 and/or the classifier 144 to select, for each tone 402, based on the selection features (e.g., diagonal 414 and partial SIC distances 410), a selected demapper from at least a first MIMO demapper 146 and a second MIMO demapper 148. The second MIMO demapper 148 has a different performance characteristic than the first MIMO demapper 146. For example, the different performance characteristics may include a complexity, a power consumption, a processing time, or an average accuracy. The second MIMO demapper may be a different type than the first MIMO demapper. Examples of selecting the selected demapper for each tone based on the selection features are described above with respect to FIG. 4 and FIG. 5. Further details of selecting the selected demapper for each tone based on the selection features are described below with respect to FIG. 7 and FIG. 8. Accordingly, the UE 104, the RX processor 356, and/or the controller/processor 359 executing the MIMO demapper component 140 and/or the classifier 144 may provide means for selecting, for each tone, based on the selection features, a selected demapper from at least a first MIMO demapper and a second MIMO demapper.

At block 640, the method 600 may include determining, for each tone, one or more streams based on an output of the selected demapper for the tone. In an aspect, for example, the UE 104, the RX processor 356, and/or the controller/processor 359 may execute the MIMO demapper component 140 and/or the first MIMO demapper 146 or the second MIMO demapper 148 to determine, for each tone, the one or more streams based on the output of the selected demapper for the tone. The one or more streams may correspond to one or more output streams of a transmitting device (e.g., the base station 102). The number of the one or more streams may depend on the MIMO rank. The number of the one or more streams may be less than or equal to a number of antennas at the transmitting device. Accordingly, the UE 104, the RX processor 356, and/or the controller/processor 359 executing the MIMO demapper component 140 and/or the first MIMO demapper 146 or the second MIMO demapper 148 may provide means for detecting, for each tone, one or more streams using the selected demapper for the tone.

For example, at sub-block 642, the block 640 may optionally include outputting a set of bits determined by a SIC MIMO demapper for the tone. That is, the first MIMO demapper 146 may be a SIC MIMO demapper that outputs a set of bits (e.g., SIC bits 412) and the partial SIC distances 410. In an aspect, the SIC bits 412 may correspond to the one or more streams. In an aspect, at sub-block 644, the block 640 may optionally include determining at least one LLR for each stream based on a weight determined by the classifier and the set of bits for the tone. For example, as discussed above regarding FIG. 4, the LLR component 422 may generate the $LLR_{SIC}$ 426 for the first MIMO demapper 408 based on the SIC bits 412 and the weight 418.

Figure 7:
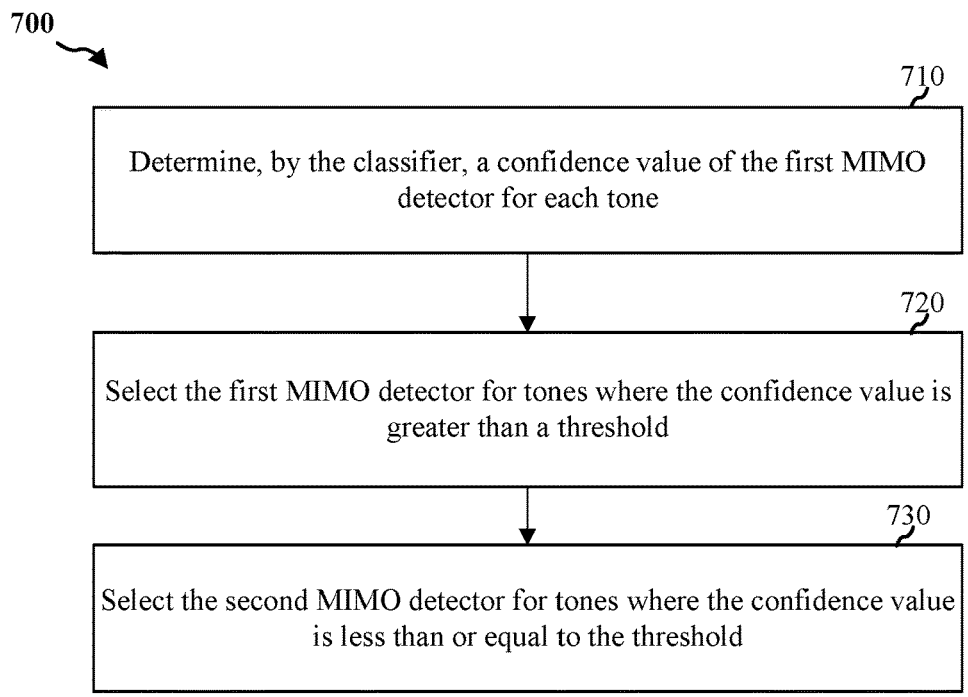
FIG. 7 is a flowchart of an example method of selecting between multiple MIMO demappers for wireless communication.

FIG. 7 is a flowchart of a method 700 of wireless communication. The method 700 may correspond to the block 630 of method 600. Accordingly, the method 700 may be performed by the UE 104, the RX processor 356, and/or the controller/processor 359 executing the MIMO demapper component 140 and/or the classifier 144. In an aspect, the method 700 may be performed by the MIMO demapper 400 or components thereof.

At block 710, the method 700 may include determining, by the classifier, a confidence value of the first MIMO demapper for each tone. In an aspect, for example, the classifier 144, 416 may determine a confidence value 420 of the first MIMO demapper 408 for each tone.

At block 720, the method 700 may include selecting the first MIMO demapper for tones where the confidence value is greater than a threshold. In an aspect, for example, the decision block 424 may select the first MIMO demapper 146, 408 for tones where the confidence value is greater than a threshold.

At block 730, the method 700 may include selecting the second MIMO demapper for tones where the confidence value is less than or equal to the threshold. In an aspect, for example, the decision block 424 may select the second MIMO demapper 148, 428 for tones where the confidence value is less than or equal to the threshold.

Figure 8:
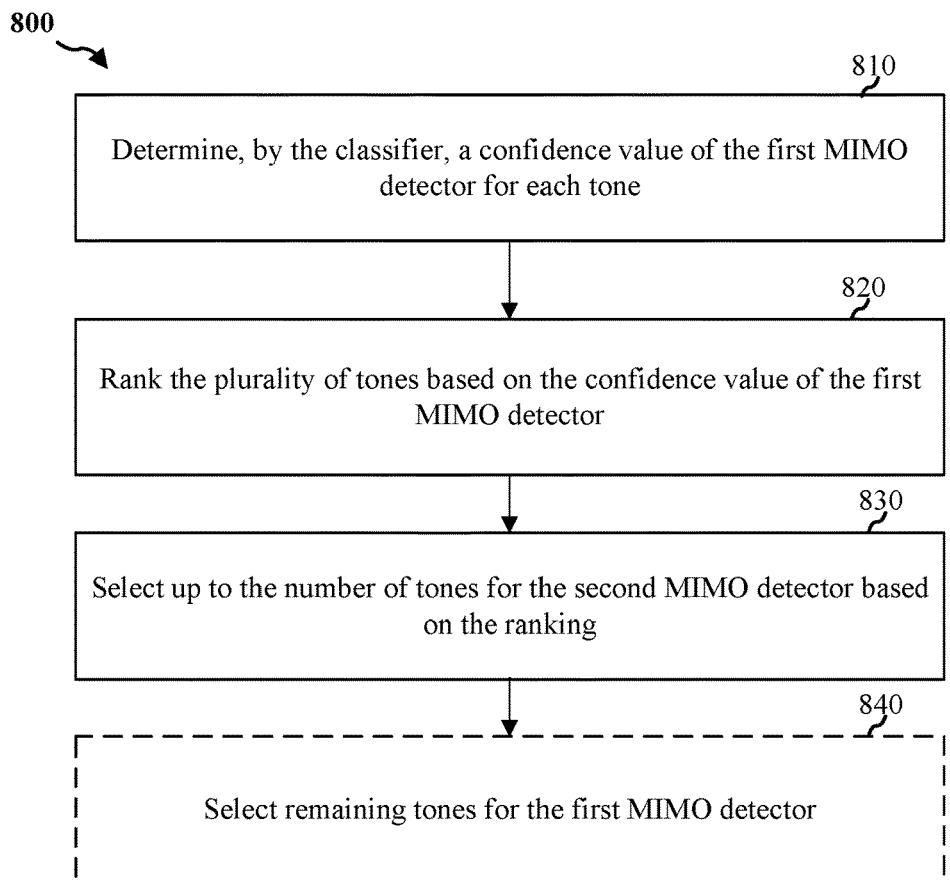
FIG. 8 is a flowchart of an example method of assigning tones to multiple MIMO demappers for wireless communication.

FIG. 8 is a flowchart of a method 800 of wireless communication. The method 800 may correspond to the block 630 of method 600. Accordingly, the method 800 may be performed by the UE 104, the RX processor 356, and/or the controller/processor 359 executing the MIMO demapper component 140 and/or the classifier 144. In an aspect, the method 800 may be performed by the MIMO demapper 500 or components thereof.

At block 810, the method 800 may include determining, by the classifier, a confidence value for the first MIMO demapper for each tone. In an aspect, for example, the classifier 144 and/or classifiers 516 may determine a confidence value 420 of the first MIMO demapper 408 for each tone.

At block 820, the method 800 may include ranking the plurality of tones based on the confidence value for the first MIMO demapper. In an aspect, for example, the classifier 144 and/or the sorter 510 may rank the plurality of tones based on the confidence value 420 for the first MIMO demapper 146, 508.

At block 830, the method 800 may include selecting up to the number of tones for the second MIMO demapper based on the ranking. In an aspect, for example, the classifier 144 and/or the sorter 510 may select up to the number of tones for the second MIMO demapper 528 based on the ranking. For example, the sorter 510 may select up to the maximum number of tones that the second MIMO demapper 528 can process, which may be less than a maximum number of tones received when operating at a maximum throughput. The sorter 510 may select the lowest ranked tones (e.g., the tones where the classifiers 516 indicate a low confidence in the first MIMO demapper 508). Accordingly, the second MIMO demapper 528 may process the tones where the second MIMO demapper 528 is most likely to improve performance.

At block 840, the method 800 may optionally include selecting remaining tones for the first MIMO demapper. For example, the sorter 510 may select the remaining tones for the first MIMO demapper 508. The remaining tones may include any tones not selected for the second MIMO demapper 528. The remaining tones may be the highest ranked tones (e.g., where the first MIMO demapper 508 is most likely to correctly detect the streams). In an aspect, for example, where the throughout is less than the maximum throughout (e.g., lower modulation scheme or resource blocks), there may be no remaining tones because the second MIMO demapper 528 may process all of the received tones.

Figure 9:
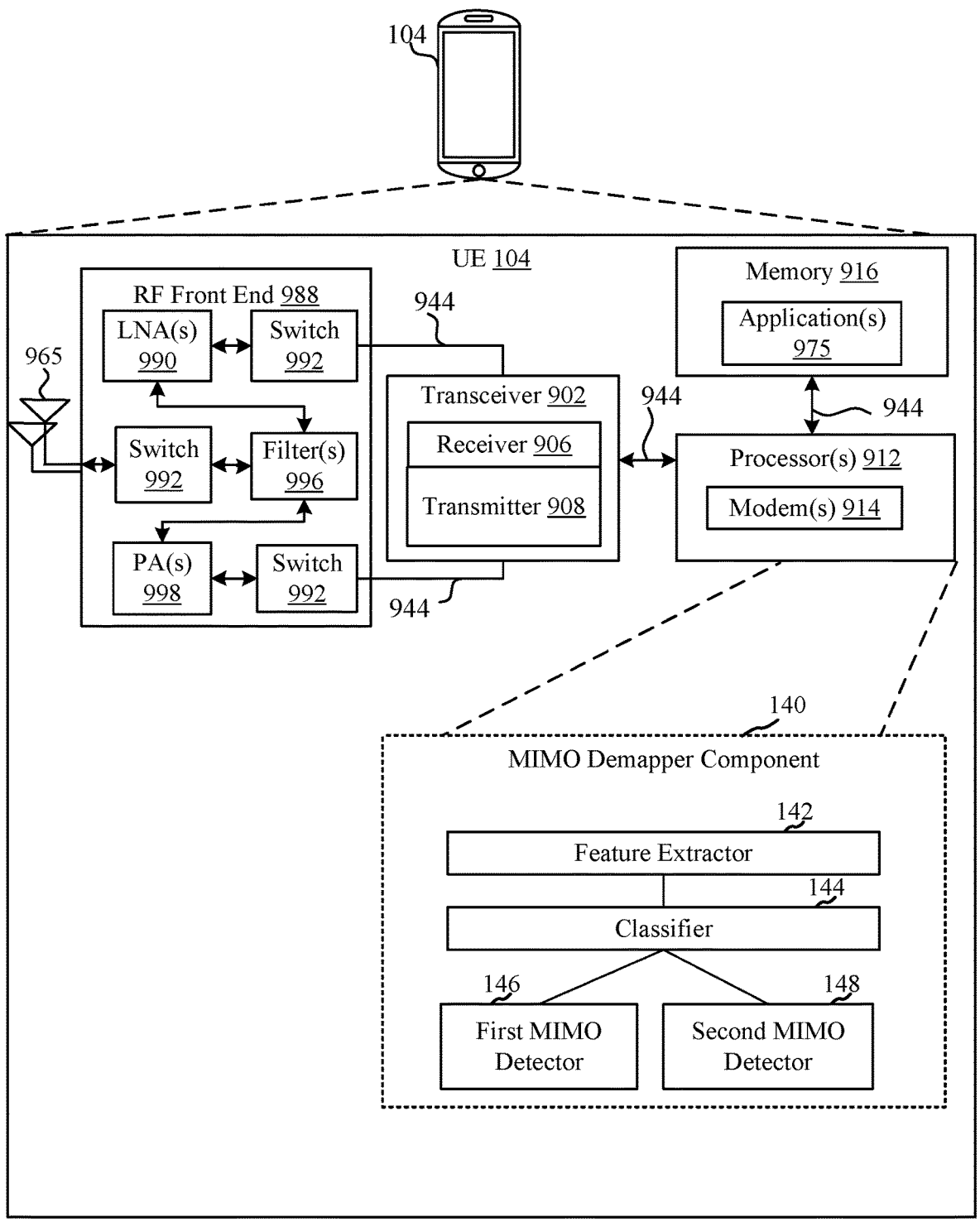
FIG. 9 is a schematic diagram of example components of the UE of FIG. 1.

Referring to FIG. 9, one example of an implementation of UE 104 may include a variety of components, some of which have already been described above, but including components such as one or more processors 912 and memory 916 and transceiver 902 in communication via one or more buses 944, which may operate in conjunction with modem 914, and MIMO demapper component 140 to enable one or more of the functions described herein related to demapping MIMO streams. Further, the one or more processors 912, modem 914, memory 916, transceiver 902, RF front end 988 and one or more antennas 965 may be configured to support voice and/or data calls (simultaneously or non-simultaneously) in one or more radio access technologies. The antennas 965 may include one or more antennas, antenna elements, and/or antenna arrays.

In an aspect, the one or more processors 912 may include a modem 914 that uses one or more modem processors. The various functions related to MIMO demapper component 140 may be included in modem 914 and/or processors 912 and, in an aspect, may be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with MIMO demapper component 140 may be performed by transceiver 902.

Also, memory 916 may be configured to store data used herein and/or local versions of applications 975, MIMO demapper component 140 and/or one or more of subcomponents thereof being executed by at least one processor 912. Memory 916 may include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining MIMO demapper component 140 and/or one or more of subcomponents thereof, and/or data associated therewith, when UE 104 is operating at least one processor 912 to execute MIMO demapper component 140 and/or one or more subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and may include one or more low-noise amplifiers (LNAs) 990, one or more switches 992, one or more power amplifiers (PAs) 998, and one or more filters 996 for transmitting and receiving RF signals.

In an aspect, LNA 990 may amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 may be used by RF front end 988 to filter a received signal to obtain an input RF signal. Similarly, in an aspect, for example, a respective filter 996 may be used to filter an output from a respective PA 998 to produce an output signal for transmission. In an aspect, each filter 996 may be connected to a specific LNA 990 and/or PA 998. In an aspect, RF front end 988 may use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver 902 may be tuned to operate at specified frequencies such that UE 104 can communicate with, for example, one or more base stations 102 or one or more cells associated with one or more base stations 102. In an aspect, for example, modem 914 may configure transceiver 902 to operate at a specified frequency and power level based on the UE configuration of the UE 104 and the communication protocol used by modem 914.

In an aspect, modem 914 may be a multiband-multimode modem, which can process digital data and communicate with transceiver 902 such that the digital data is sent and received using transceiver 902. In an aspect, modem 914 may be multiband and be configured to support multiple frequency bands for a specific communications protocol. In an aspect, modem 914 may be multimode and be configured to support multiple operating networks and communications protocols. In an aspect, modem 914 may control one or more components of UE 104 (e.g., RF front end 988, transceiver 902) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 10:
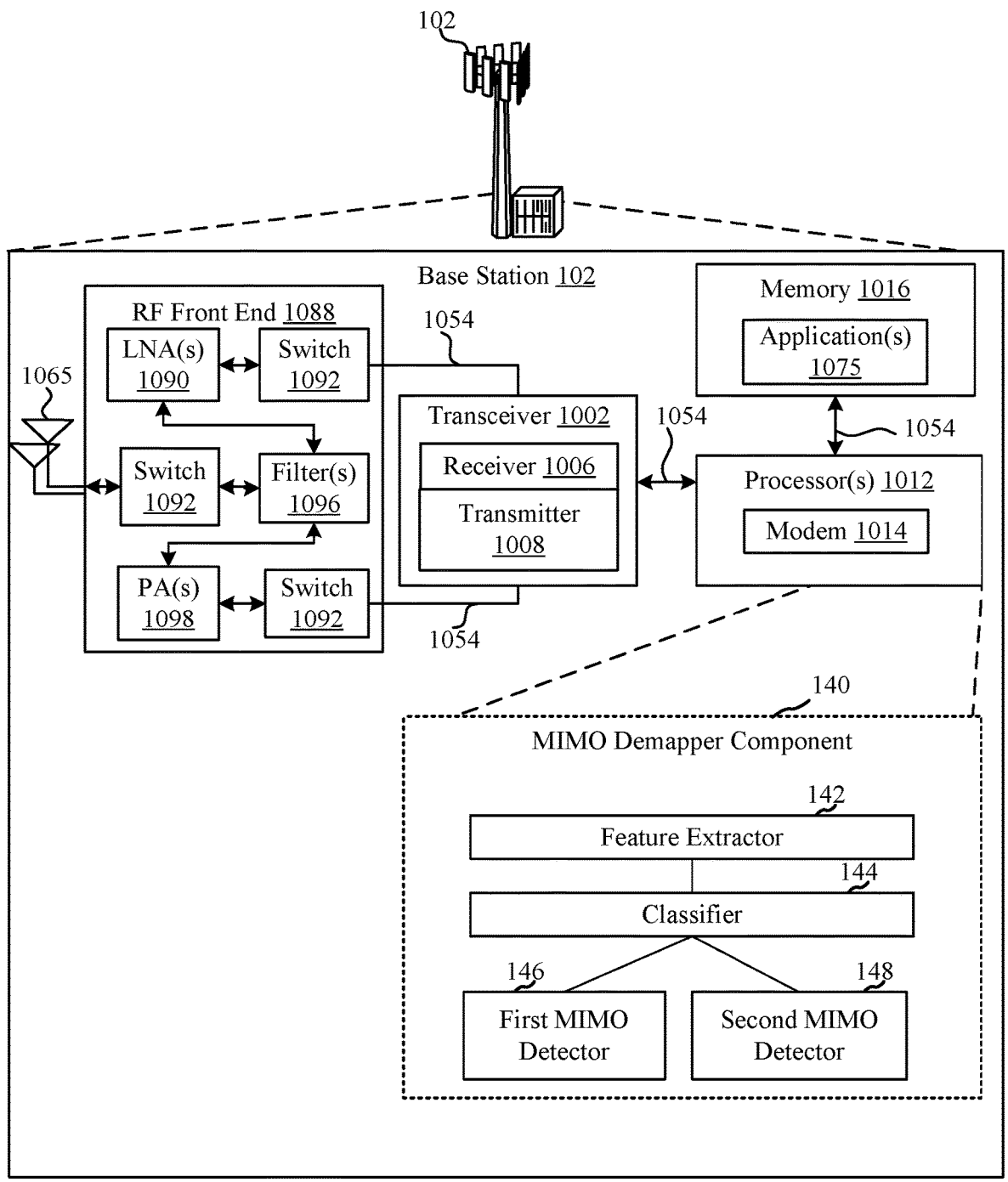
FIG. 10 is a schematic diagram of example components of the base station of FIG. 1.

Referring to FIG. 10, one example of an implementation of base station 102 may include a variety of components, some of which have already been described above, but including components such as one or more processors 1012 and memory 1016 and transceiver 1002 in communication via one or more buses 1054, which may operate in conjunction with modem 1014 and MIMO demapper component 140 to enable one or more of the functions described herein related to MIMO demapping.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE IMPLEMENTATIONS

An example method of wireless communication, comprising: receiving, via a plurality of antennas, a plurality of signals including a plurality of tones; determining selection features for each tone of the plurality of tones; selecting, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper; and determining, for each tone, one or more streams based on an output of the selected demapper for the tone.

The above example method, wherein the selecting comprises: determining, by the classifier, a confidence value of the first MIMO demapper for each tone; selecting the first MIMO demapper for tones where the confidence value is greater than a threshold; and selecting the second MIMO demapper for tones where the confidence value is less than or equal to the threshold.

Any of the above example methods, wherein a number of tones for the second MIMO demapper is less than a number of the plurality of tones, and wherein the selecting, for each tone, comprises: determining, by the classifier, a confidence value of the first MIMO demapper for each tone; ranking the plurality of tones based on the confidence value of the first MIMO demapper; and selecting up to the number of tones for the second MIMO demapper based on the ranking.

Any of the above example methods, wherein determining the selection features for each tone comprises performing SIC on the respective tone to determine partial distances.

Any of the above example methods, wherein the first MIMO demapper is a SIC MIMO demapper that produces the partial distances and a set of bits for each tone, wherein determining, for a respective tone, the one or more streams using the SIC MIMO demapper as the selected demapper comprises outputting the set of bits for the tone.

Any of the above example methods, wherein the classifier outputs a weight for each tone, wherein determining, for the respective tone, the one or more streams using the SIC MIMO demapper as the selected demapper comprises determining a log likelihood ratio based on the weight and the set of bits for the tone.

Any of the above example methods, wherein the second MIMO demapper is a fixed complexity approximate maximum likelihood demapper.

Any of the above example methods, wherein the classifier is a neural network classifier trained based on a sphere decoder output as a correct output for each sample for a training set of input signals and channel conditions.

A first example apparatus for wireless communication, comprising: a memory; and at least one processor coupled to the memory and configured to: receive via a plurality of antennas a plurality of signals including a plurality of tones; determine selection features for each tone of the plurality of tones; select, for each tone, by a classifier based on the selection features, a selected demapper from at least a first MIMO demapper and a second MIMO demapper, wherein the second MIMO demapper has a different performance characteristic than the first MIMO demapper; and determine, for each tone, one or more streams based on an output of the selected demapper for the tone.

The above first example apparatus, wherein the at least one processor is configured to: determine, by the classifier, a confidence value of the first MIMO demapper for each tone; select the first MIMO demapper for tones where the confidence value is greater than a threshold; and select the second MIMO demapper for tones where the confidence value is less than or equal to the threshold.

Any of the above first example apparatuses, wherein a number of tones for the second MIMO demapper is less than a number of the plurality of tones, and wherein the at least one processor is configured to: determine, by the classifier, a confidence value of the first MIMO demapper for each tone; rank the plurality of tones based on the confidence value of the first MIMO demapper; and select up to the number of tones for the second MIMO demapper based on the ranking.

Any of the above first example apparatuses, wherein the at least one processor is configured to perform SIC on the respective tone to determine partial distances for the selection features.

Any of the above first example apparatuses, wherein the first MIMO demapper is a SIC MIMO demapper that produces the partial distances and a set of bits for each tone, wherein the at least one processor is configured to output the set of bits for the tone.

Any of the above first example apparatuses, wherein the classifier outputs a weight for each tone, wherein the at least one processor is configured to determine a log likelihood ratio based on the weight and the set of bits for the tone.

Any of the above first example apparatuses, wherein the second MIMO demapper is a fixed complexity approximate maximum likelihood demapper.

Any of the above first example apparatuses, wherein the classifier is a neural network classifier trained based on a sphere decoder output as a correct output for each sample for a training set of input signals and channel conditions.

A second example apparatus for wireless communication, comprising: means for receiving via a plurality of antennas a plurality of signals including a plurality of tones; means for determining selection features for each tone of the plurality of tones; means for selecting, for each tone, by a classifier based on the selection features, a selected demapper from at least a first MIMO demapper and a second MIMO demapper, wherein the second MIMO demapper has a different performance characteristic than the first MIMO demapper; and means for determining, for each tone, one or more streams based on an output of the selected demapper for the tone.

The above second example apparatus, wherein the means for selecting is configured to: determine, by the classifier, a confidence value of the first MIMO demapper for each tone; select the first MIMO demapper for tones where the confidence value is greater than a threshold; and select the second MIMO demapper for tones where the confidence value is less than or equal to the threshold.

Any of the above second example apparatuses, wherein a number of tones for the second MIMO demapper is less than a number of the plurality of tones, and wherein the means for selecting is configured to: determine, by the classifier, a confidence value of the first MIMO demapper for each tone; rank the plurality of tones based on the confidence value of the first MIMO demapper; and select up to the number of tones for the second MIMO demapper based on the ranking.

Any of the above second example apparatuses, wherein the means for determining the selection features for each tone is configured to perform SIC on the respective tone to determine partial distances.

Any of the above second example apparatuses, wherein the first MIMO demapper is a SIC MIMO demapper that produces the partial distances and a set of bits for each tone, wherein the means for determining the one or more streams, using the SIC MIMO demapper as the selected demapper, is configured to output the set of bits for the tone.

Any of the above second example apparatuses, wherein the classifier outputs a weight for each tone, wherein the means for determining the one or more streams, using the SIC MIMO demapper as the selected demapper, is configured to determine a log likelihood ratio based on the weight and the set of bits for the tone.

Any of the above second example apparatuses, wherein the second MIMO demapper is a fixed complexity approximate maximum likelihood demapper.

Any of the above second example apparatuses, wherein the classifier is a neural network classifier trained based on a sphere decoder output as a correct output for each sample for a training set of input signals and channel conditions.

An example non-transitory computer-readable medium storing computer executable code, the code when executed by a processor causes the processor to: receive via a plurality of antennas a plurality of signals including a plurality of tones; determine selection features for each tone of the plurality of tones; select, for each tone, by a classifier based on the selection features, a selected demapper from at least a first MIMO demapper and a second MIMO demapper, wherein the second MIMO demapper has a different performance characteristic than the first MIMO demapper; and determine, for each tone, one or more streams based on an output of the selected demapper for the tone.

The above example non-transitory computer-readable medium, wherein the code to select the selected demapper comprises code to: determine, by the classifier, a confidence value of the first MIMO demapper for each tone; select the first MIMO demapper for tones where the confidence value is greater than a threshold; and select the second MIMO demapper for tones where the confidence value is less than or equal to the threshold.

Any of the above example non-transitory computer-readable mediums, wherein a number of tones for the second MIMO demapper is less than a number of the plurality of tones, and wherein the code to select the selected demapper comprises code to: determine, by the classifier, a confidence value of the first MIMO demapper for each tone; rank the plurality of tones based on the confidence value of the first MIMO demapper; and select up to the number of tones for the second MIMO demapper based on the ranking.

Any of the above example non-transitory computer-readable mediums, wherein the code to determine the selection features comprises code to perform SIC on the respective tone to determine partial distances.

Any of the above example non-transitory computer-readable mediums, wherein the first MIMO demapper is a SIC MIMO demapper that produces the partial distances and a set of bits for each tone, wherein the code to determine the one or more streams includes code to output the set of bits for the tone.

Any of the above example non-transitory computer-readable mediums, wherein the classifier outputs a weight for each tone, wherein the code to determine the one or more streams includes code to determine a log likelihood ratio based on the weight and the set of bits for the tone.

Any of the above example non-transitory computer-readable mediums, wherein the second MIMO demapper is a fixed complexity approximate maximum likelihood demapper.

Any of the above example non-transitory computer-readable mediums, wherein the classifier is a neural network classifier trained based on a sphere decoder output as a correct output for each sample for a training set of input signals and channel conditions.

What is claimed is:

1. A method of wireless communication, comprising:
receiving, via a plurality of antennas, a plurality of signals including a plurality of tones;
determining selection features for each tone of the plurality of tones;
selecting, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper, wherein the first MIMO demapper is a successive interference cancellation (SIC) MIMO demapper that produces partial distances and a set of bits for each tone; and
determining, for each tone, one or more streams based on an output of the selected demapper for each tone.

2. The method of claim 1, wherein the selecting comprises:
determining, by the classifier, a confidence value of the first MIMO demapper for each tone;
selecting the first MIMO demapper for tones where the confidence value is greater than a threshold; and
selecting the second MIMO demapper for tones where the confidence value is less than or equal to the threshold.

3. The method of claim 1, wherein a number of tones for the second MIMO demapper is less than a number of the plurality of tones, and wherein the selecting, for each tone, comprises:
determining, by the classifier, a confidence value of the first MIMO demapper for each tone;
ranking the plurality of tones based on the confidence value of the first MIMO demapper; and
selecting up to the number of tones for the second MIMO demapper based on the ranking.

4. The method of claim 1, wherein determining the selection features for each tone comprises using the partial distances as the selection features.

5. The method of claim 4, wherein determining, for each tone, the one or more streams using the SIC MIMO demapper as the selected demapper comprises outputting the set of bits for each tone.

6. The method of claim 5, wherein the classifier outputs a weight for each tone, wherein determining, for each tone, the one or more streams using the SIC MIMO demapper as the selected demapper comprises determining a log likelihood ratio based on the weight and the set of bits for each tone.

7. The method of claim 1, wherein the second MIMO demapper is a fixed complexity approximate maximum likelihood demapper.

8. The method of claim 1, wherein the classifier is a neural network classifier trained based on a sphere decoder output as a correct output for each sample for a training set of input signals and channel conditions.

9. An apparatus for wireless communication, comprising:
a memory; and at least one processor coupled to the memory and configured to:
  receive via a plurality of antennas a plurality of signals including a plurality of tones;
  determine selection features for each tone of the plurality of tones;
  select, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper, wherein the first MIMO demapper is a successive interference cancellation (SIC) MIMO demapper that produces partial distances and a set of bits for each tone; and
  determine, for each tone, one or more streams based on an output of the selected demapper for each tone.

10. The apparatus of claim 9, wherein the at least one processor is configured to:
  determine, by the classifier, a confidence value of the first MIMO demapper for each tone;
  select the first MIMO demapper for tones where the confidence value is greater than a threshold; and
  select the second MIMO demapper for tones where the confidence value is less than or equal to the threshold.

11. The apparatus of claim 9, wherein a number of tones for the second MIMO demapper is less than a number of the plurality of tones, and wherein the at least one processor is configured to:
  determine, by the classifier, a confidence value of the first MIMO demapper for each tone;
  rank the plurality of tones based on the confidence value of the first MIMO demapper; and
  select up to the number of tones for the second MIMO demapper based on the ranking.

12. The apparatus of claim 9, wherein the at least one processor is configured to use the partial distances as the selection features.

13. The apparatus of claim 12, wherein the at least one processor is configured to output the set of bits for each tone for which the first MIMO demapper is selected.

14. The apparatus of claim 13, wherein the classifier outputs a weight for each tone, wherein the at least one processor is configured to determine a log likelihood ratio based on the weight and the set of bits for the tone.

15. The apparatus of claim 9, wherein the second MIMO demapper is a fixed complexity approximate maximum likelihood demapper.

16. The apparatus of claim 9, wherein the classifier is a neural network classifier trained based on a sphere decoder output as a correct output for each sample for a training set of input signals and channel conditions.

17. An apparatus for wireless communication, comprising:
  means for receiving via a plurality of antennas a plurality of signals including a plurality of tones;
  means for determining selection features for each tone of the plurality of tones;
  means for selecting, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper, wherein the first MIMO demapper is a successive interference cancellation (SIC) MIMO demapper that produces partial distances and a set of bits for each tone; and
  means for determining, for each tone, one or more streams based on an output of the selected demapper for each tone.

18. The apparatus of claim 17, wherein the means for selecting is configured to:
  determine, by the classifier, a confidence value of the first MIMO demapper for each tone;
  select the first MIMO demapper for tones where the confidence value is greater than a threshold; and
  select the second MIMO demapper for tones where the confidence value is less than or equal to the threshold.

19. The apparatus of claim 17, wherein a number of tones for the second MIMO demapper is less than a number of the plurality of tones, and wherein the means for selecting is configured to:
  determine, by the classifier, a confidence value of the first MIMO demapper for each tone;
  rank the plurality of tones based on the confidence value of the first MIMO demapper; and
  select up to the number of tones for the second MIMO demapper based on the rank.

20. The apparatus of claim 19, wherein the means for determining the selection features for each tone is configured to use the partial distances as the selection features.

21. The apparatus of claim 20, wherein the means for determining the one or more streams, using the SIC MIMO demapper as the selected demapper, is configured to output the set of bits for each tone.

22. The apparatus of claim 21, wherein the classifier outputs a weight for each tone, wherein the means for determining the one or more streams, using the SIC MIMO demapper as the selected demapper, is configured to determine a log likelihood ratio based on the weight and the set of bits for each tone.

23. The apparatus of claim 17, wherein the second MIMO demapper is a fixed complexity approximate maximum likelihood demapper.

24. The apparatus of claim 17, wherein the classifier is a neural network classifier trained based on a sphere decoder output as a correct output for each sample for a training set of input signals and channel conditions.

25. A non-transitory computer-readable medium storing computer executable code, the code when executed by a processor causes the processor to:
  receive via a plurality of antennas a plurality of signals including a plurality of tones;
  determine selection features for each tone of the plurality of tones;
  select, for each tone, by a classifier based on the selection features, a selected demapper from at least a first multiple-input, multiple-output (MIMO) demapper and a second MIMO demapper, wherein the second MIMO demapper has a different performance characteristic than the first MIMO demapper, wherein the first MIMO demapper is a successive interference cancellation (SIC) MIMO demapper that produces partial distances and a set of bits for each tone; and
  determine, for each tone, one or more streams based on an output of the selected demapper for each tone.

26. The non-transitory computer-readable medium of claim 25, wherein the code to select the selected demapper comprises code to:
  determine, by the classifier, a confidence value of the first MIMO demapper for each tone;
  select the first MIMO demapper for tones where the confidence value is greater than a threshold; and select the second MIMO demapper for tones where the confidence value is less than or equal to the threshold.

27. The non-transitory computer-readable medium of claim 25, wherein a number of tones for the second MIMO demapper is less than a number of the plurality of tones, and wherein the code to select the selected demapper comprises code to:
- determine, by the classifier, a confidence value of the first MIMO demapper for each tone;
- rank the plurality of tones based on the confidence value of the first MIMO demapper; and
- select up to the number of tones for the second MIMO demapper based on the ranking.

28. The non-transitory computer-readable medium of claim 25, wherein the code to determine the selection features comprises code to use the partial distances as the selection features.

29. The non-transitory computer-readable medium of claim 28, wherein the code to determine the one or more streams includes code to output the set of bits for each tone for which the first MIMO demapper is selected.

30. The non-transitory computer-readable medium of claim 25, wherein the classifier is a neural network classifier trained based on a sphere decoder output as a correct output for each sample for a training set of input signals and channel conditions.

* * * * *